(12) United States Patent
Tang

(10) Patent No.: US 7,746,636 B2
(45) Date of Patent: Jun. 29, 2010

(54) ELECTRONIC DEVICE WITH SUPPORT LEGS

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 5 days.

(21) Appl. No.: 12/180,556

(22) Filed: Jul. 27, 2008

(65) Prior Publication Data

US 2009/0268396 A1  Oct. 29, 2009

(30) Foreign Application Priority Data

Apr. 28, 2008   (CN) .......................... 2008 1 0301354

(51) Int. Cl.
*H05K 5/00* (2006.01)
*H05K 7/00* (2006.01)

(52) U.S. Cl. .............................. 361/679.55; 361/679.59

(58) Field of Classification Search ............ 361/679.55, 361/679.59
See application file for complete search history.

(56) References Cited

U.S. PATENT DOCUMENTS

| 5,297,003 A * | 3/1994 | Nomura et al. ......... 361/679.12 |
| 6,880,796 B2 * | 4/2005 | Khor et al. .................. 248/677 |
| 7,364,126 B2 * | 4/2008 | Tsai et al. ................ 248/188.8 |
| 2007/0012856 A1 * | 1/2007 | Chan et al. .................. 248/677 |

* cited by examiner

*Primary Examiner*—Jayprakash N Gandhi
*Assistant Examiner*—Anthony M Haughton
(74) *Attorney, Agent, or Firm*—Zhigang Ma

(57) ABSTRACT

An exemplary electronic device (30) includes a main body (40) and two supporting mechanisms (60). The supporting mechanisms are formed at two adjacent corners of the main body respectively. Each supporting mechanism includes a support leg (62) and a sliding member (63). The support leg is rotatably connected to the main body. The sliding member is slidably connected to the main body. The support leg is movably connected to the sliding member, in order to make the support leg disengage form the sliding member when the sliding member sliding relative to the main body.

18 Claims, 9 Drawing Sheets

ELECTRONIC DEVICE WITH SUPPORT LEGS

BACKGROUND OF THE INVENTION

1. Field of the Invention

The present invention generally relates to electronic devices, particularly to an electronic device with a main body and a rotatable display body.

2. Discussion of the Related Art

A notebook computer mainly includes a main body with a keyboard and a display body. The display body is rotatably attached to the main body in order that the display body can be opened and closed relative to the main body. In use, the main body is generally disposed on a desktop. However, an angle between the main body and the desktop is normally 0 degree. Thereby, the keyboard is uncomfortable for a user to operate, and the user easily feels tired after long time of using the notebook. In addition, when the notebook computer is laid on the desktop, the main body of the notebook computer touches the desktop fully. Therefore, heat produced by internal electronic components cannot be dispersed efficiently from the main body of the notebook, even though the notebook has a fan for heat dissipation. As a result, the internal electronic components may be damaged due to overheating. Accordingly, a notebook computer which can solve the above-described problems is needed.

Referring to FIG. 9, a typical notebook computer 10 includes a main body 11 and a display body 12. The main body 11 defines a first groove 113 for receiving a keyboard 112. One end of the keyboard 112 is rotatably connected to a sidewall defining the first groove 113. A bottom wall in the first groove 113 further defines a second groove 115 for receiving an elastic member 114. One end of the elastic member 114 is rotatably connected to a sidewall of the second groove 115. In use, the keyboard 112 is rotated a desired angle relative to the main body 11, and is supported by the elastic member 114. Therefore, the keyboard 112 is slanted relative to the main body 11. As a result, a user may feel comfortable to operate on the keyboard 112. Furthermore, a gap for emitting heat is formed between the keyboard 112 and the main body 11.

However, a gap for emitting heat is formed between the keyboard 112 and the main body 11, thus dust could easily get inside of the main body 11 and deposits on the internal electronic components of the main body 11. Therefore, a short circuit of the internal electronic components may occur, and it is not easy to disperse heat produced by the internal electronic components from inside of the main body 11.

Therefore, an electronic device which overcomes the above-described shortcomings is desired.

SUMMARY

An exemplary electronic device includes a main body and two supporting mechanisms. The supporting mechanisms are formed at two adjacent corners of the main body respectively. Each supporting mechanism includes a support leg and a sliding member. The support leg is rotatably connected to the main body. The sliding member is slidably connected to the main body. The support leg is movably connected to the sliding member, in order to make the support leg disengage from the sliding member when the sliding member sliding relative to the main body.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION OF THE EMBODIMENTS

References will now be made to the drawings to describe embodiments of the present electronic device, in detail.

Figure 1:
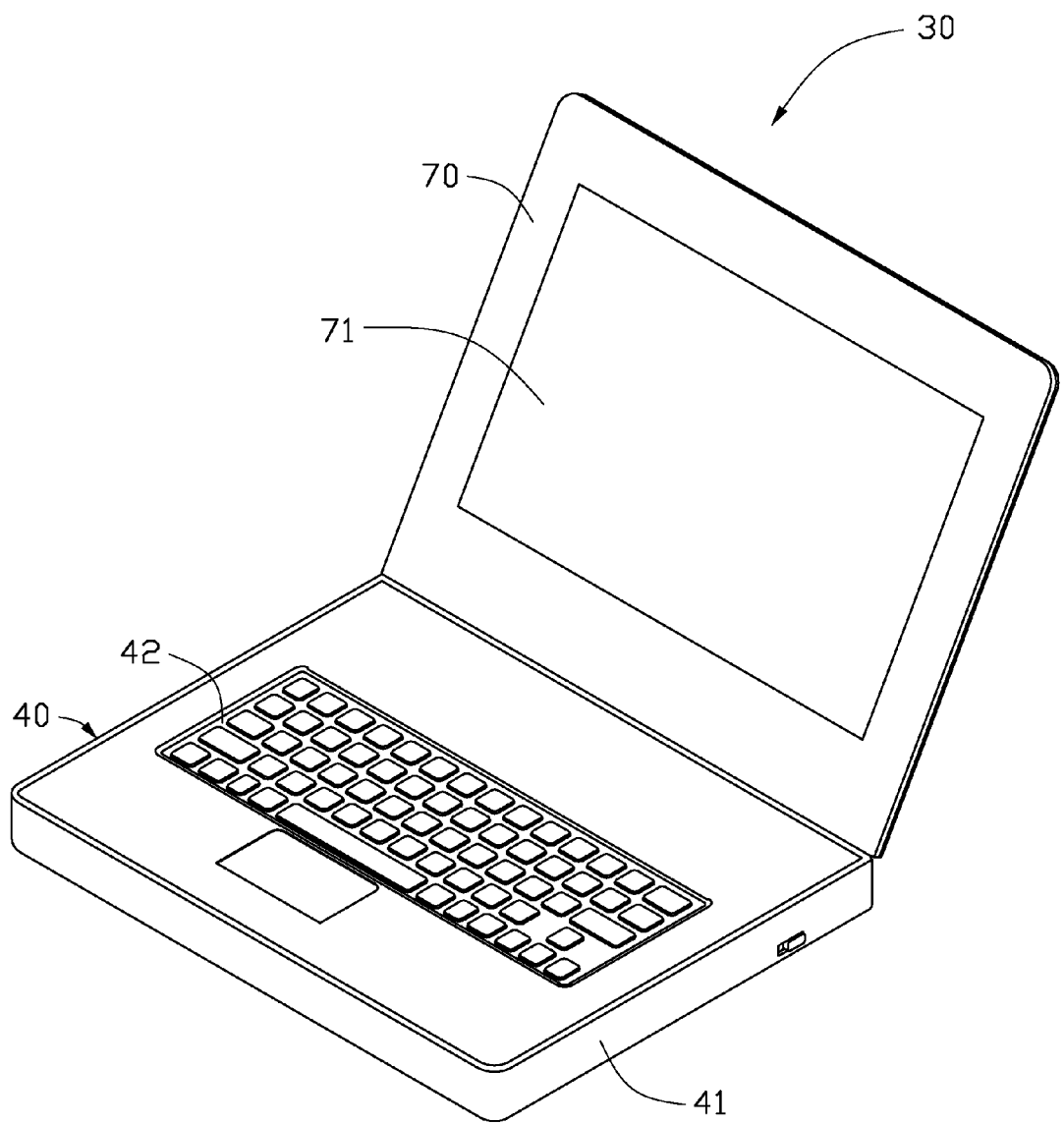
FIG. 1 is an isometric view of a notebook computer in accordance with a first embodiment of the present application.
Figure 2:
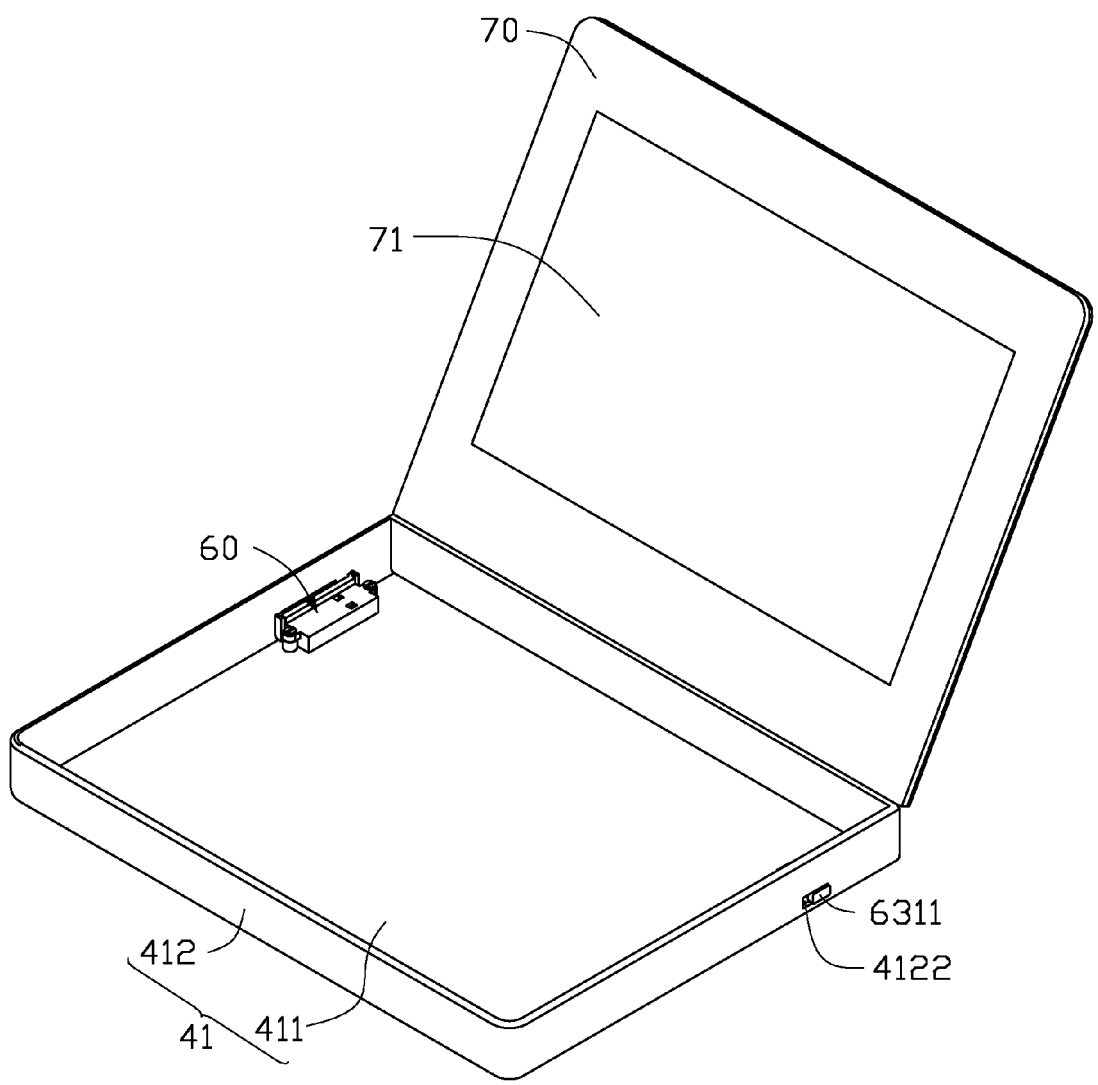
FIG. 2 is an isometric view of the notebook computer in FIG. 1, showing only the bottom housing and the display.

Referring to FIGS. 1 and 2, a notebook computer 30 in accordance with a first embodiment of the present invention is shown. The notebook computer 30 includes a main body 40 and a display body 70. The display body 70 is rotatably connected to the main body 40. The main body 40 includes a housing 41, a keyboard 42, two supporting mechanisms 60, and a plurality of electronic components (not shown). The keyboard 42 is assembled on the top of the housing 41. The supporting mechanisms 60 and the electronic components are disposed in the housing 41 under the keyboard 42. The display body 70 includes a display panel 71.

Figure 3:
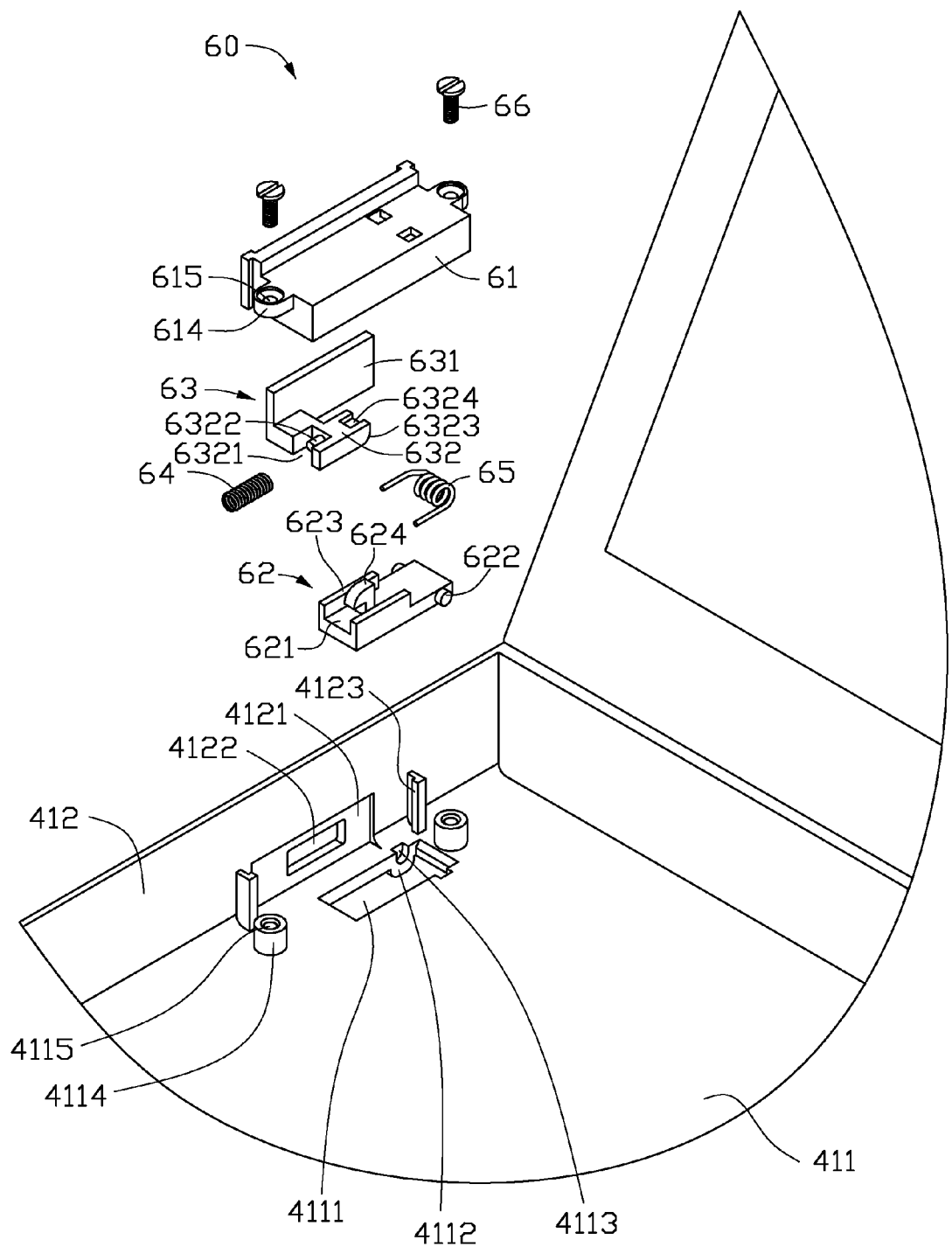
FIG. 3 is a partially exploded, isometric view of the notebook computer in FIG. 2, showing the structure of a support mechanism.
Figure 4:
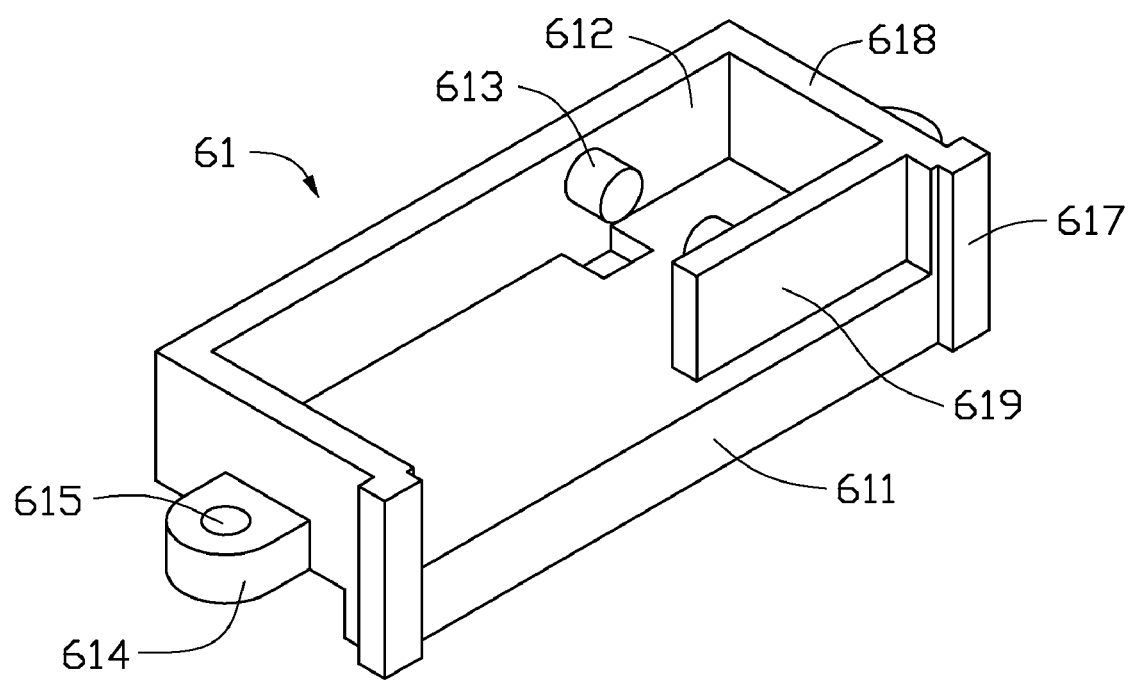
FIG. 4 is an isometric view of the fastening member in FIG. 3, viewed from a bottom-side up aspect.
Figure 8:
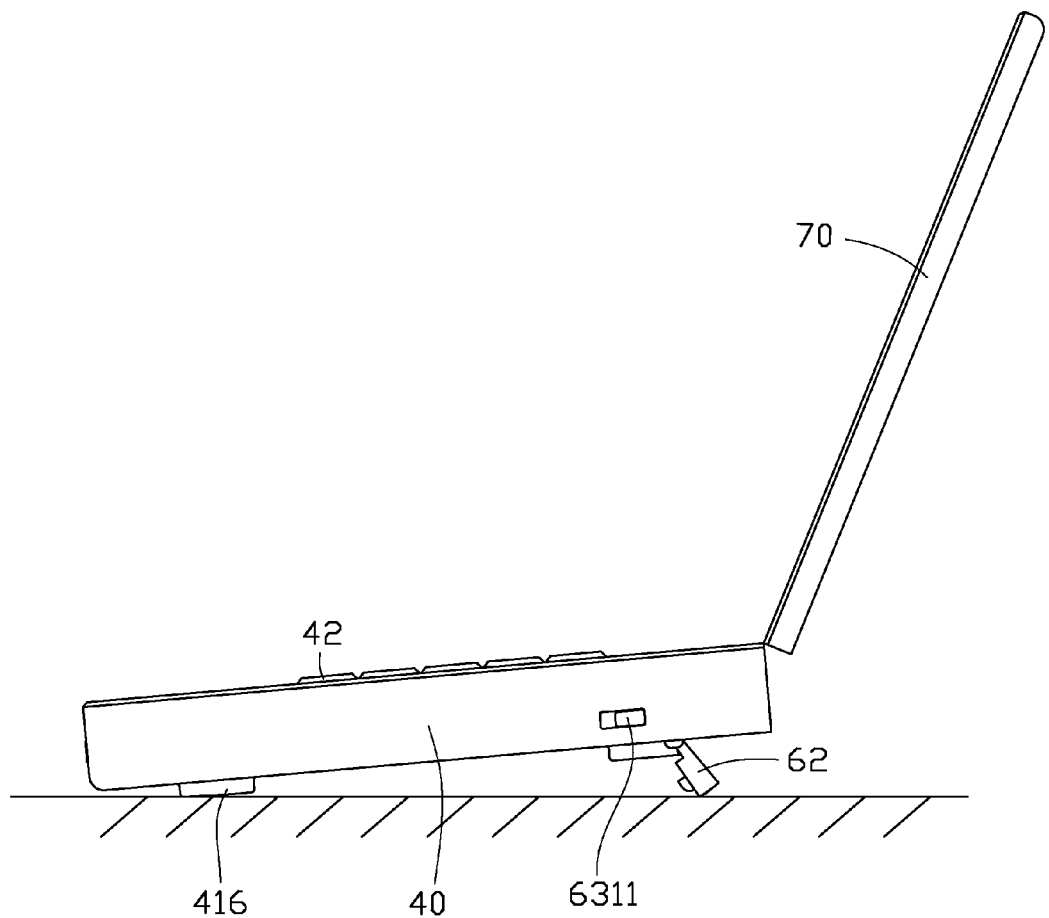
FIG. 8 is a side view of the notebook computer supported by the support legs of FIG. 2.
Figure 9:
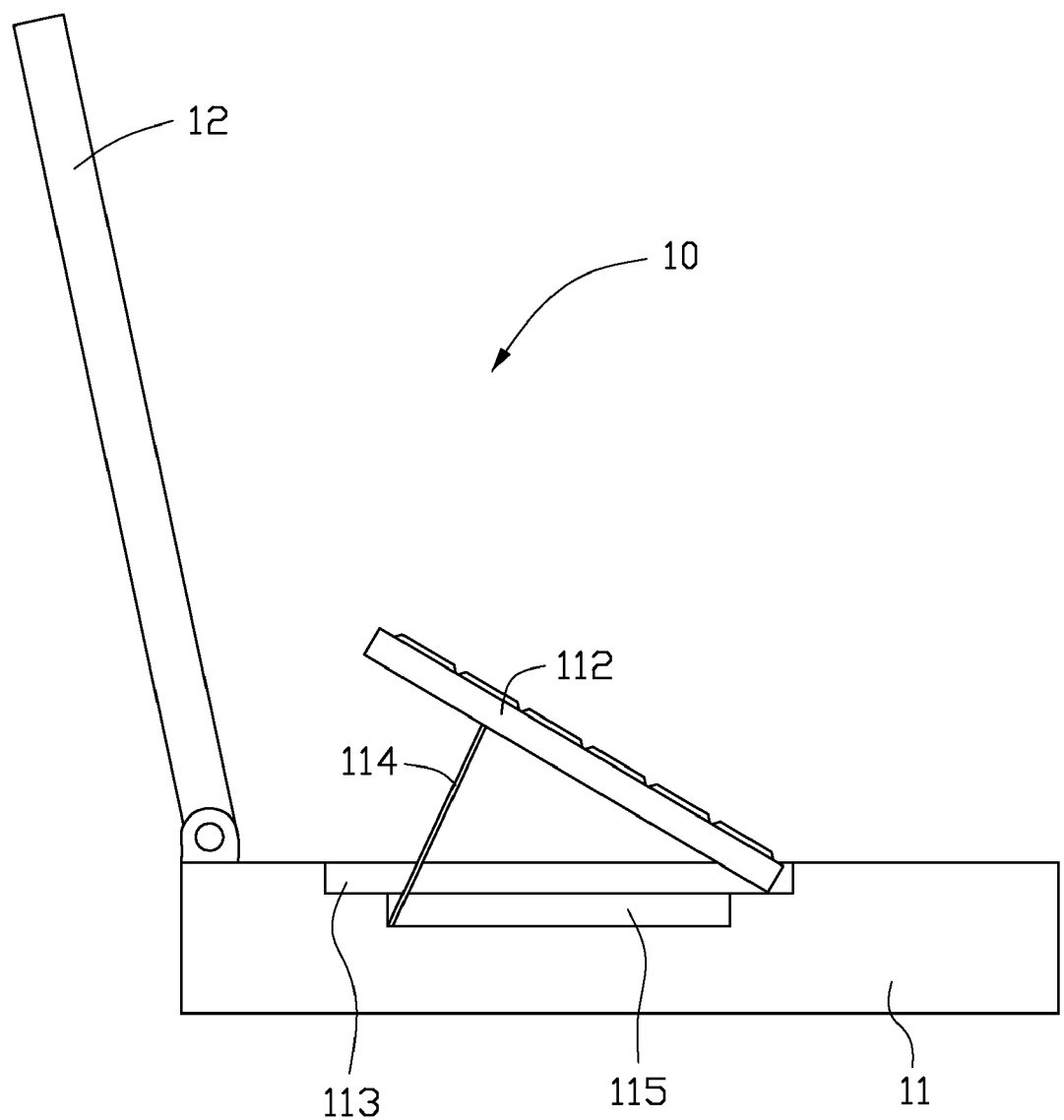
FIG. 9 is a side view of a conventional notebook computer.

The housing 41 includes a rectangular base plate 411 and four side plates 412. The side plates 412 substantially perpendicularly extend from the edges of the base plate 411. Referring also to FIG. 3, the base plate 411 defines two rectangular through holes 4111 at two corners of the base plate 411 adjacent to a joint of the housing 41 and the display body 70. Two opposite assembling portions 4112 are formed at an end of each through hole 4111, on opposite sides thereof respectively. Each assembling portions 4112 defines a U-shaped amounting groove 4113. Two fixing poles 4114 are formed on the base plate 411, and adjacent to opposite sides of the through hole 4111 respectively. Each fixing pole 4114 defines a threaded hole 4115 in the top surface. Four pads 416 are formed at four corners of the base plate 411 correspondingly (as shown in FIG. 8). The side plate 412 adjacent to the through hole 4111 defines a receiving groove 4121 corresponding to the through hole 4111. A side wall in the receiving groove 4121 defines a sliding groove 4122 in the middle. Two limiting portions 4123 are formed on the side plate 412 adjacent to opposite ends of the receiving groove 4121 correspondingly.

The supporting mechanisms 60 includes a fastening member 61, a support leg 62, a sliding member 63, a spring 64, a torsion spring 65, and two screws 66.

Figure 5:
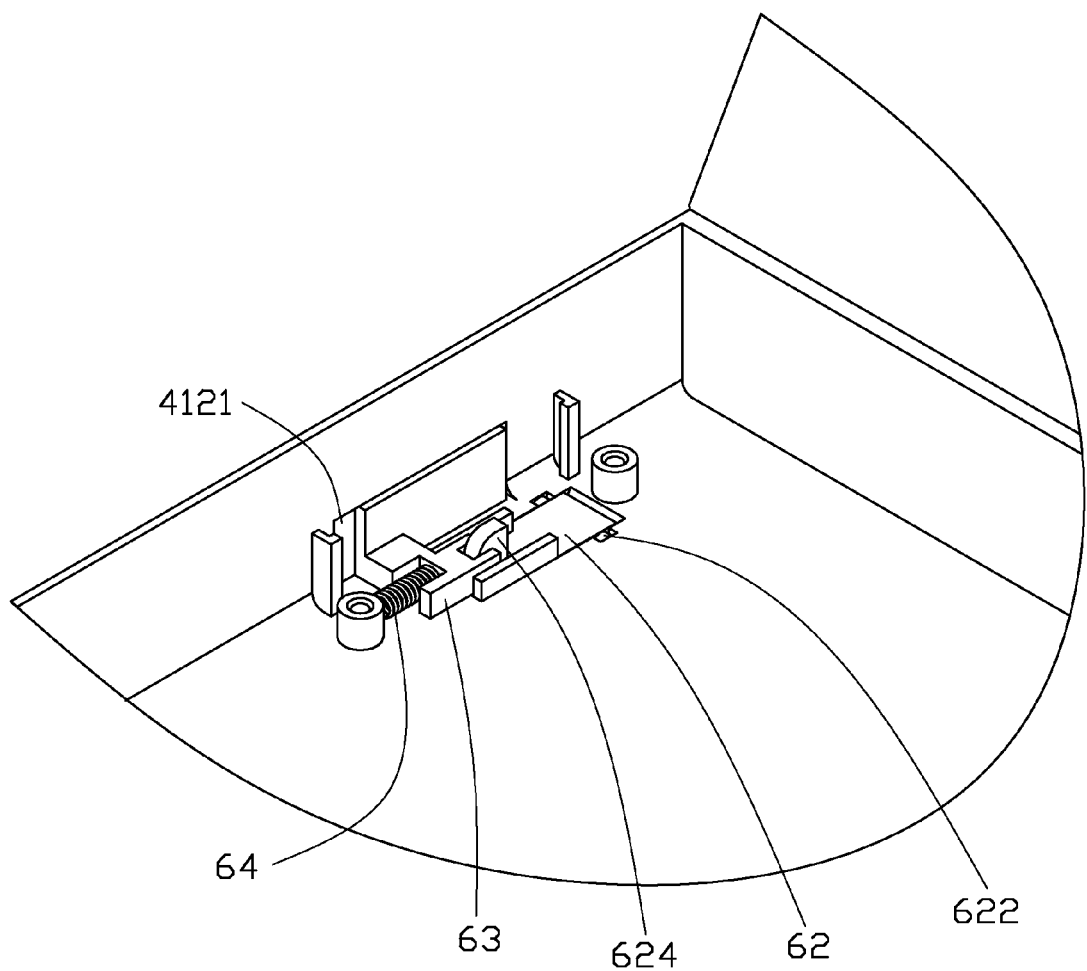
FIG. 5 is a partially isometric view of the notebook computer of FIG. 2, without the fastening member.
Figure 6:
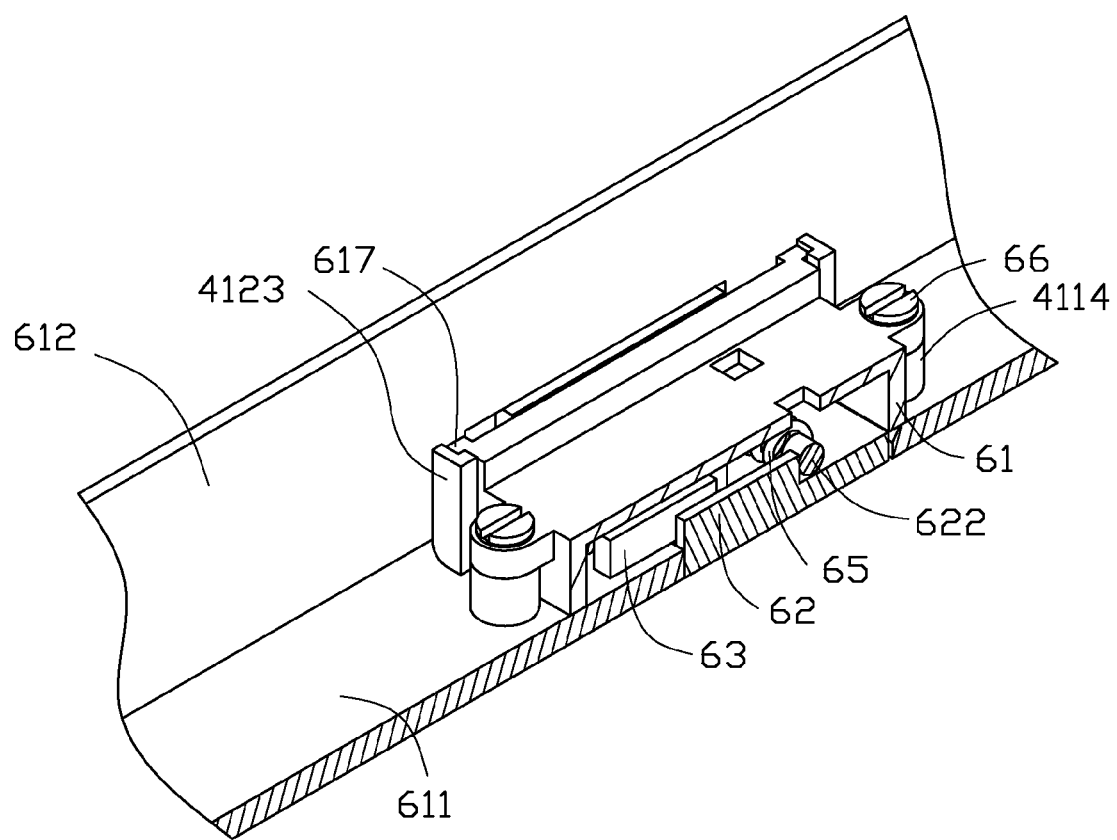
FIG. 6 is a partially isometric, cross-sectional view of the notebook computer of FIG. 2, with the support leg engaged with the sliding member.
Figure 7:
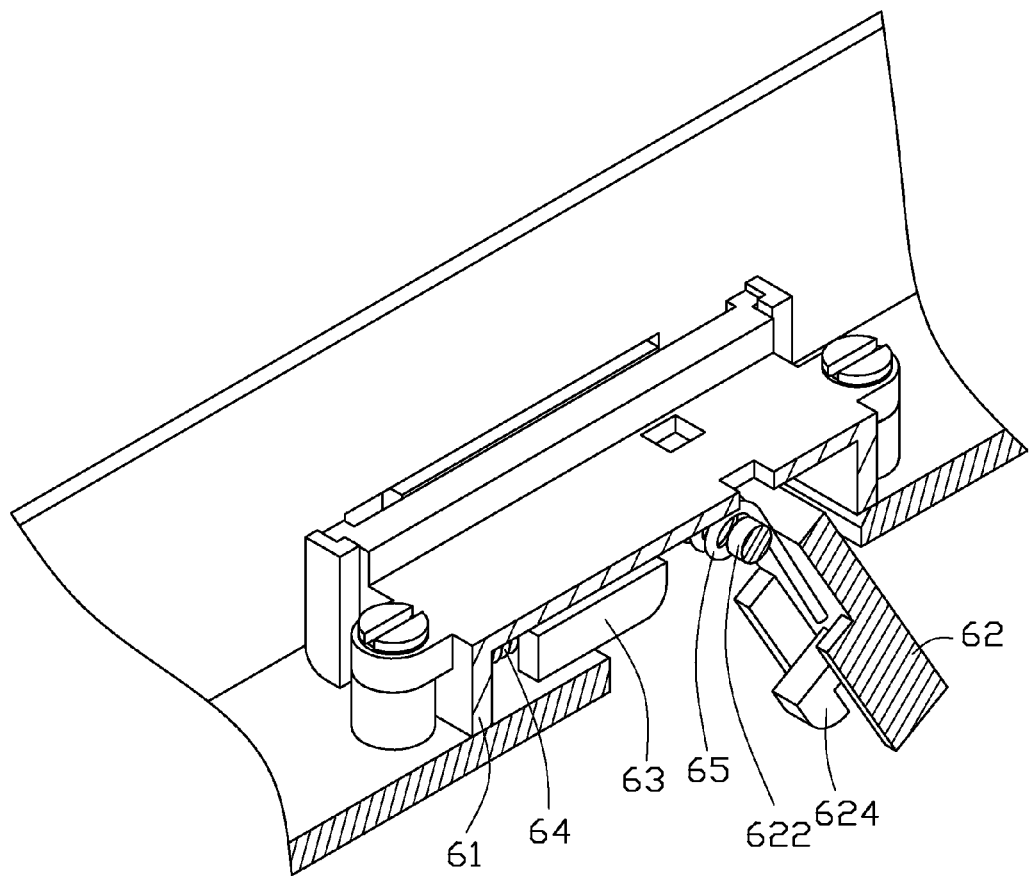
FIG. 7 is a partially isometric, cross-sectional view of the notebook computer of FIG. 2, with the support leg in use.

Referring to FIGS. 2 and 5, the fastening member 61 includes a rectangular base portion 611, a first side wall 612, two second side walls 618, and a third side wall 619. The first side wall 612, the second side walls 618, and the third side wall 619 perpendicularly extend from the edges of the base plate 411. The first side wall 612 is opposite to the third side wall 619. Two cylindrical protrusions 613 are formed on the first side wall 612 and the third side wall 619 respectively. Two positioning pieces 614 are formed on opposite ends of the base portion 611. Each positioning piece 614 defines a positioning hole 615 therein. A limiting protrusion 617 is formed at an end of each second side wall 612.

The support leg 62 includes a rectangular main portion 621. The length of the main portion 621 is slightly less than that of the through hole 4111 of the base plate 411. Two shafts 622 are formed on opposite sides of an end of the main portion 621. Two opposite flanges 623 perpendicularly extend at the other end of the main portion 621. A hook 624 is formed on the main portion 621 between the flanges 623.

The sliding member 63 includes a first sliding plate 631 and a second sliding plate 632 perpendicularly extending from a side of the first sliding plate 631. A switching portion 6311 is formed on a surface of the first sliding plate 631 away from the second sliding plate 632 (as shown in FIG. 3). The switching portion 6311 is configured for being slidably received in the sliding groove 4122 of the side plate 412. The second sliding plate 632 defines a rectangular cutout 6321 at the edge. A limiting post 6322 is formed in the cutout 6321 of the second sliding plate 632. A rectangular positioning portion 6323 extends from a side of the second sliding plate 632. The positioning portion 6323 defines a hook slot 6324, configured to receive the hook 624 of the support leg 62.

Referring to FIGS. 2 through 7, in a process of assembling one supporting mechanism 60 to a corner of the housing 41, the shafts 622 of the support leg 62 are received in the assembling groove 4113 of the assembling portions 4112 correspondingly, thus rotatably connected the support leg 62 to the housing 41. The spring 64 is sleeved on the limiting post 6322 of the sliding member 63. The first sliding plate 631 of the sliding member 63 is received in the receiving groove 4121 of the side plates 412, and the switching portion 6311 is inserted into the sliding groove 4122 of the side plates 412. After that, the positioning portion 6323 of the sliding member 63 is disposed between two flanges 623, and the hook 624 of the support leg 62 is disposed in the hook slot 6324 of the sliding member 63. The torsion spring 65 is sleeved on the cylindrical protrusions 613 of the fastening member 61. Each limiting protrusion 617 of the fastening member 61 engages with one corresponding limiting portion 4123 of the housing 41. The screws 66 extend out of the positioning holes 615 of the fastening members 61, and screw into the thread hole 4115 of the fixing poles 4114 respectively, thus fixing the supporting mechanism 60 to the housing. Then, the spring 64 is resisted between the sliding member 63 and the fastening member 61. The torsion spring 65 is resisted between the fastening member 61 and support leg 62, thereby producing an elastic force for driving the support leg 62 away from the fastening member 61. The other supporting mechanism 60 is assembled to another corner of the housing 41, according to the above-described assembling steps.

Also referring to FIG. 8, in use, an external force is applied on the switching portion 6311 of the sliding member 63, in order to push the sliding member 63 away from the support leg 62 till the hook 624 of the support leg 62 disengages from the sliding member 63. After that, the support leg 62 is driven to rotate relative to the shafts 622 by the elastic force of the torsion spring 65 until resisting the housing 41, thus supporting the notebook computer 30. Then, the external force is released, and the sliding member 63 is driven back to slide to the original position by an elastic force of the spring 64. When the notebook computer 30 does not need to be supported by the support legs 62, the external force is applied on the switching portion 6311 of the sliding member 63 again, in order to push the sliding member 63 away from the support leg 62. The support leg 62 is driven to rotate relative to the shafts 622 by another external force, until the support leg 62 received in the through hole 4111 of the housing 41 again. After that, the external force is released from the switching portion 6311. As such, the sliding member 63 is drive to slide by the elastic force of the spring 64 along a direction close to the support legs 62, till the hook 624 of the support leg 62 engages with the hook slot 6324 of the sliding member 63 again.

Because the notebook computer 30 can be tilted away from a desktop via the help of the support legs 60, operating the keyboard 42 of the main body 40 would be more comfortable. Furthermore, heat can be dispersed from a bottom of the main body 40, thus making the heat produced by the electronic components can be dispersed more efficiently. The electronic components are sealed between the housing 41 and keyboard 42, in order to isolate the electronic components. In addition, when the notebook computer 30 need to be supported by the support legs 62, a user only need to push the switching portions 6311 from sides of the main body 40. That is, the notebook computer 30 is convenient for use.

In an alternative embodiment, the supporting mechanism 60 can only includes a support leg and a sliding member. The sliding member is slidably connected to the housing 40. The support leg is rotatably connected to the housing 40, and can engage with the sliding member.

It should be understood that, the notebook computer 30 may include one single supporting mechanism 60. In that case, the supporting mechanism 60 is preferably disposed on the middle of one side of the main body 40. In addition, the notebook computer 30 can include three or more supporting mechanisms 60. Furthermore, the spring 64 and the torsion spring 65 can be replaced by other elastic members.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electronic device, comprising:
   a main body comprising a housing, the housing comprising a base plate and a plurality of side plates substantially perpendicularly extending from an edge of the base plate; and
   at least one supporting mechanism having a support leg and a sliding member, the support leg being rotatably connected to the main body, the sliding member being slidably connected to the main body, and the support leg being detachably connected to the sliding member, and the support leg being capable of disengaging from, and engaging with, the sliding member when the sliding member sliding relative to the main body;
   wherein the sliding member comprises a first sliding plate and a second sliding plate substantially perpendicularly extending from a side of the first sliding plate; a switching portion is formed on the first sliding member; one of the side plates of the main body defines a sliding groove; the switching portion is slidably received in the sliding groove of the side plate; the second sliding plate is connected to the base plate by an elastic member.

2. The electronic device as claimed in claim 1, wherein a hook is formed on the support leg, the hook engages with the sliding member.

3. The electronic device as claimed in claim 1, wherein the base plate defines at least one through hole, two assembling portions are formed at an end of the through hole and opposite to each other and on opposite sides of the through hole respectively, each assembling portion defines a amounting groove, two shafts are formed on opposite sides of an end of the support leg, and each shaft is rotatably received in the amounting groove of one corresponding assembling portion.

4. The electronic device as claimed in claim 1, wherein a limiting post is formed on the second sliding plate, each of the at least one supporting mechanism further comprises a spring sleeved on the limiting post.

5. The electronic device as claimed in claim 1, wherein each of the at least one supporting mechanism further comprises a fastening member and an elastic member, the fastening member is fixed to main body and opposite to the support leg, the elastic member is resisted between the fastening member and the support leg, thus producing an elastic force to drive the support leg away from the fastening member.

6. The electronic device as claimed in claim 5, wherein the elastic member is a torsion spring.

7. The electronic device as claimed in claim 5, wherein the fastening member comprises a main plate and two positioning pieces formed on opposite ends of the main plate, each positioning piece defines a positioning hole, the supporting mechanism further comprises two screws, each screw extends through the positioning hole of one corresponding positioning piece, and screws into the housing.

8. The electronic device as claimed in claim 1, wherein the number of the at least one supporting mechanism is two, the supporting mechanisms are formed at two adjacent corners of the main body respectively.

9. The electronic device as claimed in claim 1 being a notebook computer.

10. The electronic device as claimed in claim 1, further comprising a keyboard, the keyboard being disposed on the top of the housing.

11. An electronic device, comprising:
 a main body comprising a housing, the housing comprising a base plate and a plurality of side plates substantially perpendicularly extending from an edge of the base plate;
 a display body rotatably connected to the main body;
 at least one supporting mechanism comprising a support leg, a first elastic member, a second elastic member, and a sliding member, the support leg being rotatably connected to the main body, the elastic member being resisted between the main body and the support leg, thus producing an elastic force to drive the support leg away from the main body, the sliding member is connected to the base plate by the second elastic member, and detachably engaging with the support leg.

12. The electronic device as claimed in claim 11, wherein the first elastic member is torsion spring.

13. The electronic device as claimed in claim 11, wherein the number of the at least one supporting mechanism is two, the supporting mechanisms are formed at two adjacent corners of the main body respectively.

14. The electronic device as claimed in claim 11, wherein the main body comprises a housing, the housing comprises a base plate and a plurality of side plates, the side plates are substantially perpendicularly extending from the edge of the base plate, the support leg is rotatably connected to the base plate.

15. The electronic device as claimed in claim 11 being a notebook computer.

16. A supporting mechanism, comprising:
 a main body;
 a support leg rotatably connected to the main body,
 a sliding member slidably connected to the main body, and the support leg being detachably connected to the sliding member, in order to make the support leg disengage from the sliding member when the sliding member sliding relative to the support leg,
 wherein the sliding member comprises a first sliding plate and a second sliding plate substantially perpendicularly extending from a side of the first sliding plate; a switching portion is formed on the first sliding member.

17. The electronic device as claimed in claim 16, wherein the supporting mechanism further comprises a fastening member and an elastic member, the elastic member is resisted between the fastening member and the support leg, thus producing an elastic force to drive the support leg away from the fastening member.

18. The electronic device as claimed in claim 17, wherein the elastic member is torsion spring.

\* \* \* \* \*